United States Patent [19]

Balke et al.

[11] Patent Number: 4,710,662
[45] Date of Patent: Dec. 1, 1987

[54] DYNAMOELECTRIC MACHINE ROTOR STRUCTURE HAVING IMPROVED INSULATION

[75] Inventors: Roy L. Balke; Charles H. Merrifield; Frank E. Mizikowski, all of Erie, Pa.

[73] Assignee: General Electric Company, Salem, Va.

[21] Appl. No.: 807,046

[22] Filed: Dec. 9, 1985

[51] Int. Cl.$^4$ ............................ H02K 3/38; H02K 3/50
[52] U.S. Cl. ........................................ 310/204; 310/43; 310/270
[58] Field of Search .................... 310/43, 45, 88, 196, 310/204, 221, 260, 261, 270, 269

[56] References Cited

U.S. PATENT DOCUMENTS 3,171,999  3/1965  Kemp ................................. 310/270
3,631,279  2/1970  Solon et al. ....................... 310/270
4,591,751  5/1986  Ono ..................................... 310/43

Primary Examiner—Patrick R. Salce
Assistant Examiner—D. L. Rebsch
Attorney, Agent, or Firm—Arnold E. Renner

[57] ABSTRACT

A rotor structure for dynamoelectric machines includes a central shaft, defining a rotation axis, which supports main rotor windings. A winding support is disposed about and secured to the shaft and an encapsulated equalizer winding assembly is supported by said winding support. An expansion member is positioned between at least a portion of said encapsulated equalizer winding assembly and said winding support and an insulating resin covers at least exposed, proximate portions of said winding support, said expansion member and said encapsulated equalizer winding assembly.

16 Claims, 3 Drawing Figures

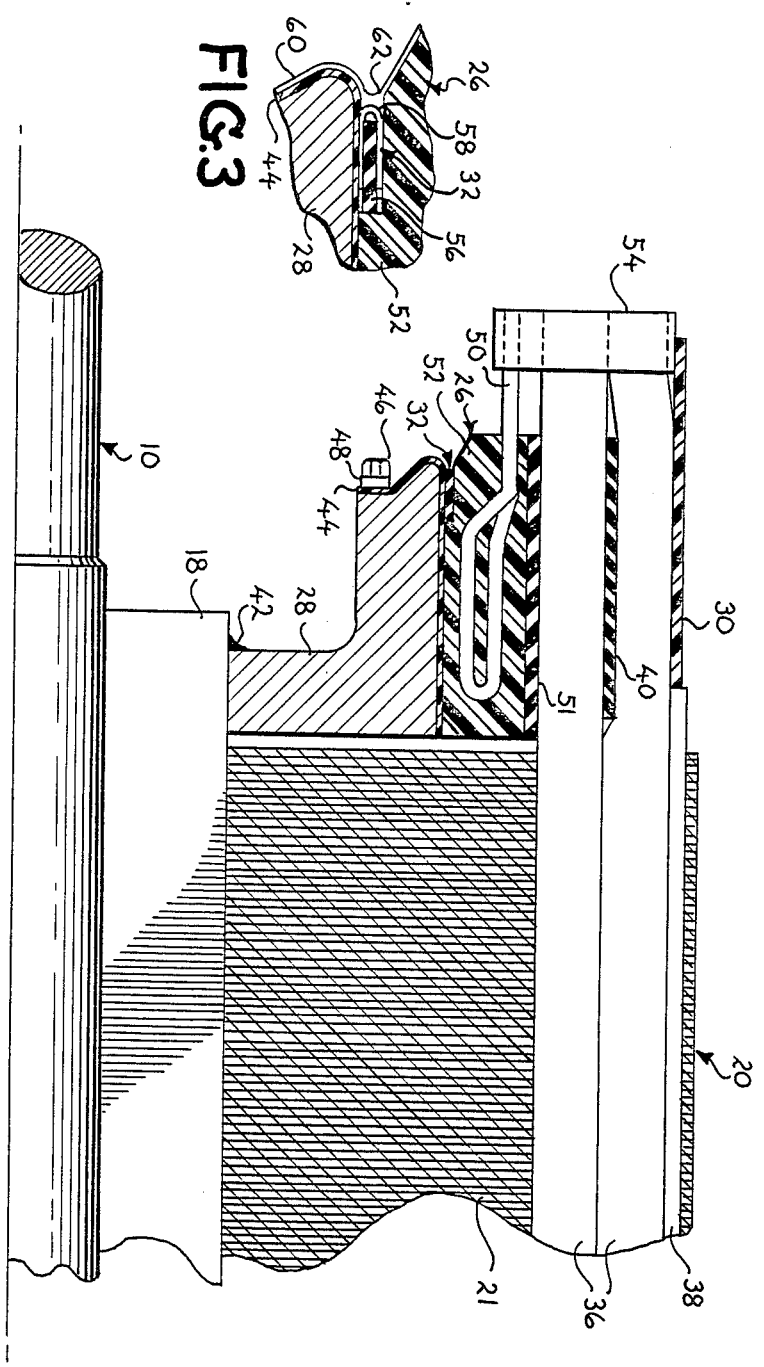

DYNAMOELECTRIC MACHINE ROTOR STRUCTURE HAVING IMPROVED INSULATION

BACKGROUND OF THE INVENTION

The present invention relates generally to rotor structures for dynamoelectric machines and, more particularly, to rotor structures which include means to preserve the installation integrity of a resin coating as normally employed on such structures.

It is well known in the dynamoelectric machine discipline to provide a rotor structure which, after assembly of the basic mechanical part, is provided with an insulating coating, normally of a resinous nature (often referred to as varnish) over all of the structure except for the bearing surfaces; e.g., shaft bearing surfaces and, where applicable, a commutator or slip rings. In certain large machines, in addition to the main rotor windings, there are included equalizer windings connected to the main windings to equalize the currents in the main windings. Whereas the main windings are supported by a magnetic structure (for example, laminations) the equalizer windings are often encapsulated in an insulating material, such as an epoxy, to form an assembly of an annular configuration. Since the equalizer windings do not have a magnetic supporting structure as such, there is often employed a metallic winding support member, supported by the shaft, around which the annular equalizer winding assembly is disposed.

The circular joint or interface between the encapsulated annular equalizer winding assembly and the winding support member can present a problem to the insulating integrity of the resin coating. First of all, the epoxy of the equalizer winding configuration normally will have a different temperature coefficient of expansion than the metallic winding support member. Compounding this difference is the fact the equalizer windings themselves are an array of current carrying members arranged in an annulus around the winding support and solidly connected by leads to the main windings and thus represent a heat source, resulting in a concentration of heat in the epoxy with respect to the winding support. Further, current heating in the main windings causes those windings to expand in the direction of their length (axially). Since the equalizer windings are solidly connected by leads to the main windings, the equalizer winding assembly also moves axially with the main windings to cause a separation between the encapsulated equalizer winding and the winding support at the interface thereof. Since the resinous (varnish) coating tends to be somewhat inflexible, resultant stresses can result in cracks in the resin coating at the interface between the annular equalizer winding assembly and the winding support member. This crack, or cracks, creates a collection area for dirt, grease, etc., and in machines having carbon brushes, dust resulting from brush wear. This contamination reduces the insulating integrity of the coating and is a potential problem area in that it increases the possibility of arcing between the various windings and the basic metallic structure of the machine.

SUMMARY OF THE INVENTION

It is, therefore, an object of the present invention to provide an improved rotor structure for a dynamoelectric machine.

It is a further object to provide an improved rotor structure of the type including main windings and equalizer windings.

It is another object to provide a rotor structure, of the type including equalizer windings, with improved insulation integrity.

It is still a further object to provide an improved rotor structure of the type having an encapsulated equalizer winding assembly disposed about a winding support which structure includes an expansion member placed between at least a portion of the encapsulated equalizer winding assembly and the winding support to thereby preserve the insulating integrity of a resinous coating.

The foregoing and other objects are achieved in accordance with the present invention by providing a dynamoelectric machine rotor structure which includes a central shaft defining an axis of rotor rotation. Main rotor windings, contained in a laminated magnetic core structure, are supported by said shaft and a winding support is supported by and secured to said shaft. An encapsulated equalizer winding assembly, supported by said winding support, is positioned adjacent an end of the main rotor winding. An expansion member is positioned between at least a portion of said encapsulating equalizer winding assembly and said winding support and an insulating resinous coating covers at least the exposed, proximate portions of said winding support, said expansion member and said encapsulated equalizing winding assembly.

BRIEF DESCRIPTION OF THE DRAWING

While the present invention is defined in the claims annexed to and forming a part of this specification, a better understanding thereof can be had from the following description taken in conjunction with the accompanying drawing in which:

FIG. 2 is a partial view, partly in section, of the end of the rotor of FIG. 1 illustrating the present invention; and, FIG. 3 a broken away, enlarged view of a portion of the rotor structure of FIG. 2 which more clearly illustrates the present invention.

DETAILED DESCRIPTION

Figure 1:
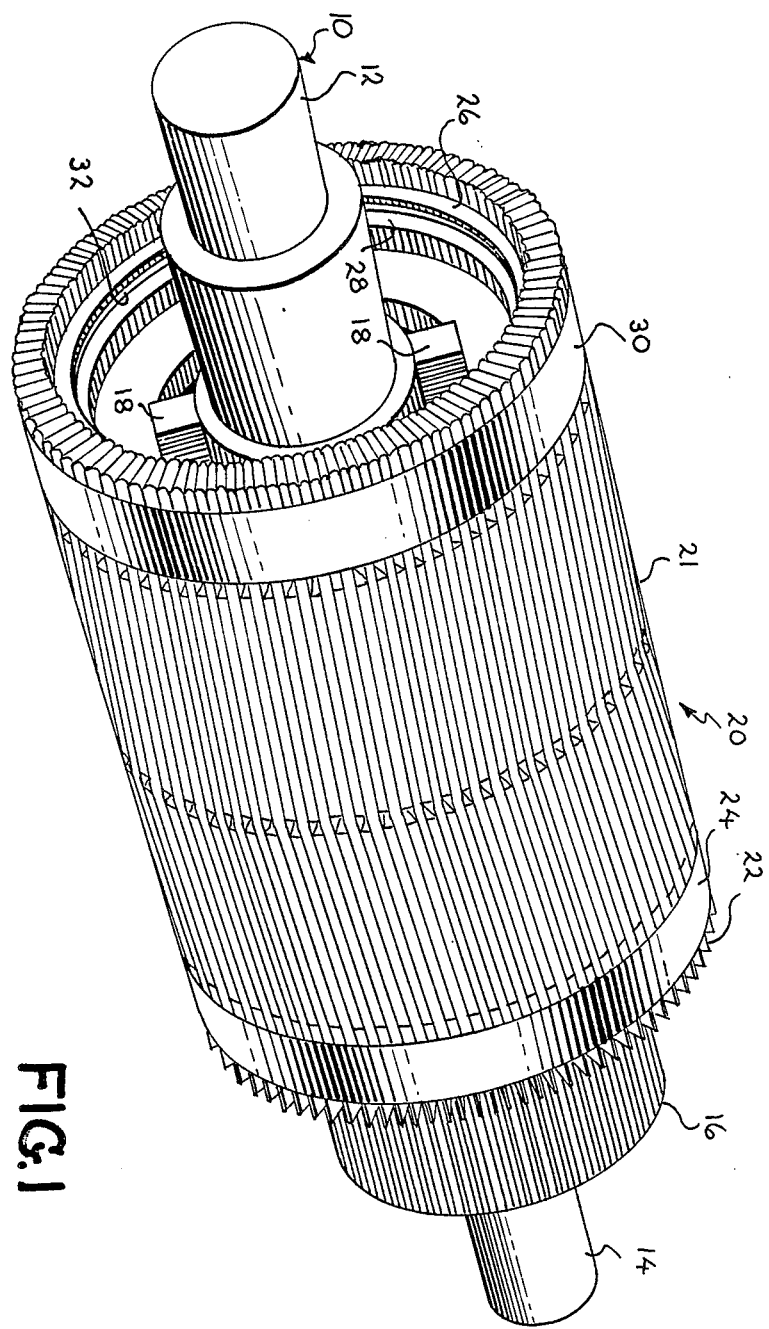
Fig. 1 is a perspective view of a rotor for a dynamoelectric machine embodying the present invention.

For a complete understanding of the invention, reference is first made to FIG. 1 which shows in perspective view a rotor structure in accordance with the present invention. The structure includes a shaft, shown generally at 10, extending longitudinally along the structure, defining an axis of rotation. At respective ends of the shaft are two bearing surfaces 12 and 14 suitable for retention within suitable bearing assemblies. Since the illustrated rotor structure is of the direct current type, there is provided near the right end thereof a commutator 16 such as is well known in the art. The overall winding structure is supported by suitable members such as bars 18 which are fixed to the shaft, as by welding, and extend along the length of the winding section to be described. The number of bars is somewhat arbitrary and while two are visible in FIG. 1, in a typical rotor four such bars exist. The use of bars rather than a solid structure allows cooling air to pass along the shaft and the insides of the windings.

The main winding structure is generally illustrated at 20 and includes main windings, assembled into a laminated magnetic core 21, which have end turns 22 secured by suitable banding 24.

An encapsulated equalizer winding assembly 26 is positioned adjacent the main winding structure at the end distal to commutator 16. (In some designs a second equalizer winding assembly of substantially identical design to assembly 26 may also be positioned and connected to the commutator end of the main windings.) This assembly will be better understood with respect to FIGS. 2 and 3 but it is seen that the encapsulated assembly 26 is of an annular configuration and is generally disposed about a winding support 28 which is secured to the bars 18. Suitable structural banding 30 for rotational stresses is provided about assembly 26. Disposed between the winding support 28 and the encapsulated equalizer winding assembly 26 is an expansion member 32 which, as will be better understood with respect to FIGS. 2 and 3, is preferaly a felt member having a glass tape overlying a portion thereof. The expansion member 32 is located within a recess area between a portion of the equalizing winder assembly 26 and the winding support 28. It is this expansion member and its placement which forms the essence of the present invention within the rotor structure and will now be explained with respect to FIGS. 2 and 3.

FIG. 2 shows, broken away and partially in cross section, a portion of the rotor structure of FIG. 1. For orientation purposes, the shaft 10 and one bar 18 are again illustrated. It is seen that the magnetic structure of the main winding structure 20 includes a laminated core 21 and main windings 36 which are disposed within the slots as described with respect to FIG. 1. Suitable wedge members 38 serve to hold the main windings 36 in the slots. Windings 36 extend beyond the laminations of core 21 to the left. A suitable insulation 40 is provided between the winding 36 at the anterior ends, so that contact is made only at the outermost tips.

Winding support 28 is an annular metallic member of generally L-shaped cross-sectional configuration. It is secured to bars 18 by suitable means such as a weld 42. If desired, and as illustrated, there may be further included, in association with the winding support 28, a molded insulating member 44 which is secured to the support by a retaining ring 48 of circular configuration sized to the appropriate portion of the winding support. Ring 48 is secured to the winding support 28 by suitable means such as a plurality of bolts 46 (only one of which is illustrated in FIG. 2) disposed around the face of ring 48. The purpose of the insulating member 44 is to further enhance the insulating properties of the overall structure. Member 44 may be, for example, a premolded ring of mica/glass, polyester/glass or other suitable material of the cross-section shown in FIG. 2.

The encapsulated equalizer winding assembly 26 is of an annular configuration and includes a plurality of individual coils 50, one of which is illustrated, extending around the length thereof and enclosed within a molded encapsulation or potting 52. The equalizer windings, as was earlier indicated, are for purposes of equalizing the currents in the main windings. As such, coil 50 extend outwardly (to the left) from the encapsulation 52 where they are connected to the main windings by suitable connections 54, all as is well known in the art. The encapsulating or potting material is customarily an electrically insulating epoxy. Additional insulation 51 may be provided between the main winding and the equalizer winding assembly 26.

The structure thus far described is that which is typical of and known in the art and, as was earlier indicated, one which normally would be impregnated and coated, except for its bearing surfaces, by suitable insulating materials of a resinous nature applied by vacuum pressure impregnation followed by dip coating. The composite of impregnation and coating resins is often referred to as varnish or varnishes and is shown at 60 in FIG. 3. The present invention resides in the inclusion of the expansion member 32 between the encapsulated equalizer winding assembly 26 and the winding support 28. When included, the winding support may be considered as including the molded insulating member 44.

The precise nature and a better understanding of the expansion member may be had with respect to FIG. 3. In the enlarged, brokenaway view of FIG. 3, there is included a portion of the winding support 28, including molded insulating member 44, as well as a portion of the encapsulating material 52 of equalizer winding assembly 26. It is seen that the expansion member 32 is disposed in a recess area between assembly 26 and the winding support 28 and comprises a substantially rectangular cross sectional element 56 which is preferably of a felt material (e.g., a polyester felt such as Dacron felt) capable of being impregnated by the resinous impregnating material. A loosely woven, desized, glass cloth (e.g., of leno weave configuration) 58 capable of thorough impregnation by resinous material, overlaps that portion of the felt most exterior to the overall assembly. This glass cloth serves to reinforce the resin or varnish layer 60 which covers the assembly. The expansion member itself is an elongated strip of the felt material 32 about which the glass cloth 58 is secured as by gluing to facilitate handling and placement. As was indicated, the resin material shown at 60 would cover the entire assembly, except for the bearing surfaces, and can be applied by sequential vacuum-pressure impregnation processes and dip coating is known in the art.

The expansion member 32, disposed between the equalizer winding assembly 26 and the winding support 28, allows for various contractions and expansions of the windings, etc., and thereby prevents cracking of the resin coating in the area indicated at 62 in FIG. 3. The elimination of cracks reduce the accumulation of dirt and other contaminants particularly at discrete locations. Such contaminants tend to affect the insulating integrity of that resin coating and the rotor windings.

While there has been shown and described what is at present considered to be the preferred embodiment of the invention, modifications thereto will readily occur to those skilled in the art. It is not desired, therefore, that the present invention be limited to the specific embodiment shown and described and it is intended to cover within the appended claims all such modifications that fall within the true spirit and scope of the invention.

What is claimed:

1. A rotor structure for a dynamoelectric machine comprising:
 (a) a central shaft defining an axis of rotor rotation;
 (b) main rotor windings supported by said shaft;
 (c) a winding support disposed on and secured to said shaft;
 (d) an encapsulated equalizer winding assembly supported by said support member, said equalizer winding assembly being positioned adjacent an end of said motor windings;

(e) an expansion member disposed between at least a portion of said encapsulated equalizer winding assembly and said winding support; and, (f) an insulating resin covering at least exposed, proximate portions of said winding support, said expansion member and said encapsulated equalizer winding assembly.

2. The invention in accordance with claim 1 wherein said expansion member is disposed between the winding support and the encapsulated equalizer winding assembly in a region distal from said main windings.

3. The invention in accordance with claim 1 wherein said expansion member includes a relatively flat member of resin absorbent felt.

4. The invention in accordance with claim 3 wherein said felt is a polyester material.

5. The invention in accordance with claim 1 wherein said expansion member comprises a relatively flat member of resin absorbent felt with an overlaying loosely woven glass cloth.

6. The invention in accordance with claim 5 wherein said glass cloth is a desized leno weave.

7. The invention in accordance with claim 1 wherein said winding support includes a molded insulating member disposed over a metallic portion wherein said insulating member is positioned between said metallic portion and said expansion member.

8. The invention in accordance with claim 1 wherein said expansion a member is sized to extend over a minor portion of a common area between said support member and said encapsulated equalizer winding assembly.

9. The invention in accordance with claim 1 wherein said winding support includes a metallic portion and molded insulating member overlying at least that part of the metallic portion of said winding support contiguous to said encapsulated equalizer winding assembly and wherein said molded insulating member is positioned between said metallic portion and said expansion member.

10. In a dynamoelectric machine rotor structure of the type including a centrally extending shaft, main windings supported by said shaft, a winding support supported by said shaft and an encapsulated equalizer winding assembly disposed around said winding support contiguusly to one end of said main windings, the improvenent comprising:

(a) an expansion member positioned between at least a portion of the winding support and the encapsulated equalizer winding assembly; and, (b) an insulating resin covering at least exposed proximate portions of said winding support, said expansion member and said encapsulated equalizer winding assembly.

11. The invention in accordance with claim 10 wherein said expansion member is disposed between the winding support and the encapsulated equalizer winding assembly in a region distal from said main windings.

12. The invention in accordance with claim 10 wherein said expansion member includes a relatively flat member of resin absorbent felt.

13. The invention in accordance with claim 10 wherein said felt is a polyester material.

14. The invention in accordance with claim 10 wherein said expansion member comprises a relatively flat member of resin absorbent felt with an overlaying loosely woven glass cloth.

15. The invention in accordance with claim 10 wherein said glass cloth is a desized leno weave.

16. The invention in accordance with claim 10 wherein said expansion member is sized to extend over a minor portion of a common area between said support member and said encapsulated equalizer winding assembly.

* * * * *